United States Patent [19]

Wolzenburg

[11] Patent Number: 4,505,525

[45] Date of Patent: Mar. 19, 1985

[54] WIRE RACE BEARING WITH ROLLING CONTACT

[75] Inventor: Heinrich Wolzenburg, Dortmund, Fed. Rep. of Germany

[73] Assignee: Hoesch AG, Fed. Rep. of Germany

[21] Appl. No.: 618,210

[22] Filed: Jun. 7, 1984

[30] Foreign Application Priority Data

Jun. 7, 1983 [DE] Fed. Rep. of Germany ....... 3320457

[51] Int. Cl.[3] .............................................. F16C 27/04
[52] U.S. Cl. ................................. 384/565; 384/548; 384/559; 384/581
[58] Field of Search ................... 308/227, 231, 207 R, 308/216, 202, 234, 196

[56] References Cited

U.S. PATENT DOCUMENTS

| | | | |
|---|---|---|---|
| 3,361,500 | 1/1968 | Pöhler | 308/227 |
| 3,517,975 | 6/1970 | Lonngren | 308/227 |
| 3,802,755 | 4/1974 | Schluter et al. | 308/227 |
| 4,368,932 | 1/1983 | Wolzenburg | 308/231 |

*Primary Examiner*—Lenard A. Footland
*Attorney, Agent, or Firm*—Eric P. Schellin

[57] ABSTRACT

The bearing with rolling contact consists of wire elements (2, 4) which serve as raceways for the rolling elements (1), and an inner bearing ring (3) and an outer bearing ring (5). An insert is fitted between at least one wire element (2) and its associated wire bed (6) in the bearing ring in question (3), and this insert is designed as a tubular pressure pad (7).

4 Claims, 2 Drawing Figures

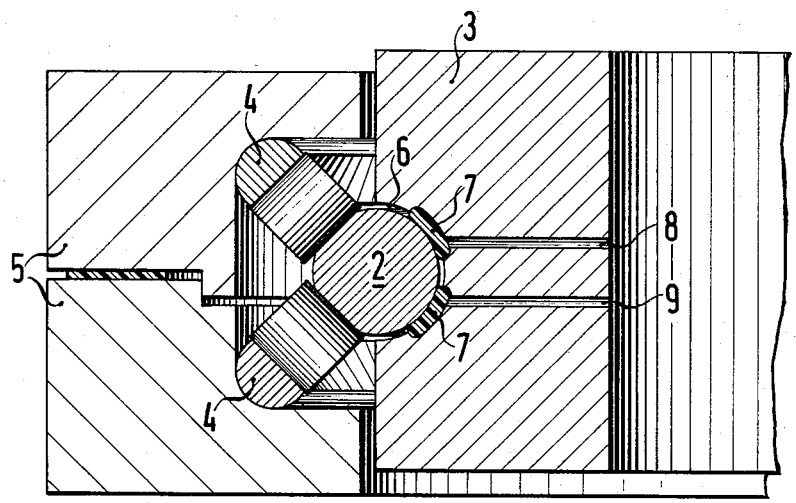
FIG. 1
FIG. 2
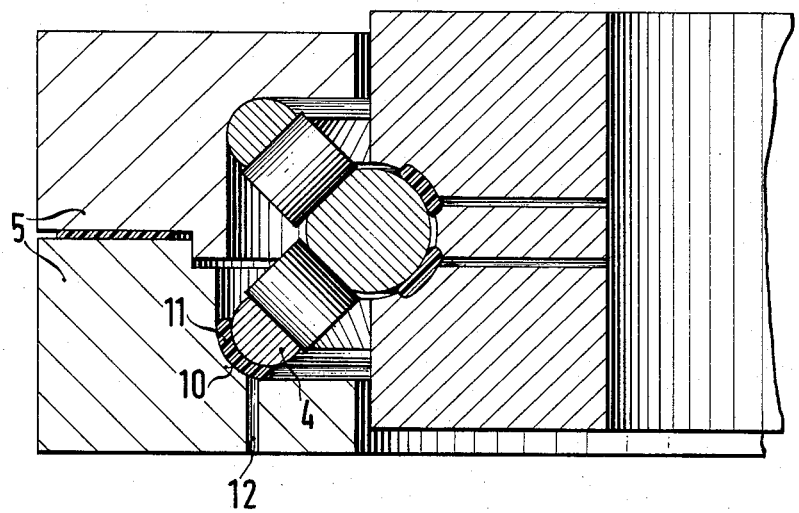

WIRE RACE BEARING WITH ROLLING CONTACT

The invention concerns a wire race bearing with rolling contact, consisting of wire elements serving as raceways for the rolling elements, and having an inner and an outer bearing ring, one of which is in two parts, and with an insert fitted between at least one wire element and its associated wire bed.

In currently-known wire race bearings with rolling contact of the above-mentioned kind, the insert is a damping element made of a more or less elastic substance (DE-GM 81 22 258). This damping element is intended to reduce shock-type loads on the wire race bearing with rolling contact, in order to subject the bearing to less arduous conditions or to reduce the vibrations of one connection part of a rotary connection compared to the other connection parts joined by the said rotary connection.

The object of the invention is to improve wire race bearings with rolling contact of the kind mentioned above in such a way that the insert can be used to vary the clearance, damping and/or resistance to rotation of the wire race bearing as required.

The solution of the problem thus posed is to design the insert as a tubular pressurised pad.

The design of the insert in accordance with the invention enables the tolerances of the wire race bearing components to be compensated. This ensures that the clearance, the damping and/or the resistance to rotation are always matched to the requirements at any given time. The clearance between the rolling elements and the raceway can also be negative. In this case, the bearing is a prestressed wire race bearing with rolling contact.

A particular advantage of the invention is that running-in and settling effects in the wire race bearing with rolling contact during the initial period of service can be automatically compensated for without any adjustment work being required.

As designed in the invention, the pressure pad is filled with a fluid which transmits the forces evenly from the wire element to the bearing ring.

In a further version of the invention, the pressure pad is connected to a generator of pressure, a pressure reservoir and/or a control system through drillings in the bearing ring and/or connection lines. This has the additional advantage that the properties of the wire race bearing with rolling contact can be matched to operating requirements of the equipment connected and varied during operation by the control system.

One preferred design version of the invention consists of having the pressure pad in several parts. The pressure pad can be separated into sections, for example, and be situated in two parts in the direction of the transmission of force of the wire race bearing with rolling contact. However, the pressure pad can also be divided into segments. The varying reaction forces exerted by the pressure pad to the varying influences acting on the diameter lead to particularly favorable running conditions of the wire race bearing with rolling contact.

The Figures show two versions of the invention. The invention is described in greater detail using these Figures, which each show a cross-section through the left-hand part of a wire race bearing with rolling contact.

In the wire race bearing with rolling contact shown in FIG. 1, the rolling elements 1 are supported by a wire element 2 against the inner bearing ring 3 on one side, and on the other side by two wire elements 4 against the two-part outer bearing ring 5, with a two-part tubular pressure pad 7 being fitted between the wire element 2 and its associated wire bed 6 in the inner bearing ring 3. The space within this pressure pad 7 is connected by drillings 8 and 9, in a manner which is not shown, to a generator of pressure, pressure reservoir and/or control system.

FIG. 2 shows a wire race bearing with rolling contact in which a further tubular pressure pad 11 is fitted between one of the wire elements 4 and the associated wire bed 10 in the outer bearing ring 5. In this instance the space within the pressure pad 7 can also be connected by means of a drilling 12 with a generator of pressure, pressure reservoir and/or control system, none of which are shown.

I claim:

1. Wire race bearing with rolling contact, consisting of rolling elements, wire elements serving as raceways for the rolling elements, and an inner and outer bearing ring, one of which is designed as two-part, and with an insert fitted between at least one wire element and its associated wire bed in the bearing ring in question, and characterised by the fact that the insert is in the form of a tubular pressure pad (7).

2. Wire race bearing with rolling contact as in claim 1, characterised by the fact that the pressure pad (7) is filled with a fluid.

3. Wire race bearing with rolling contact as in claim 1, characterised by the fact that the pressure pad (7) is connected to a generator of pressure, pressure reservoir and/or control system through drillings (8, 9) in the bearing ring (3) and/or connection lines.

4. Wire race bearing with rolling contact as in claim 1, 2 or 3, characterised by the fact that the pressure pad (7) is designed as several parts.

* * * * *